July 8, 1924.
W. BROWN
HELICOPTER
Filed Aug. 28, 1922  3 Sheets-Sheet 1
1,500,572
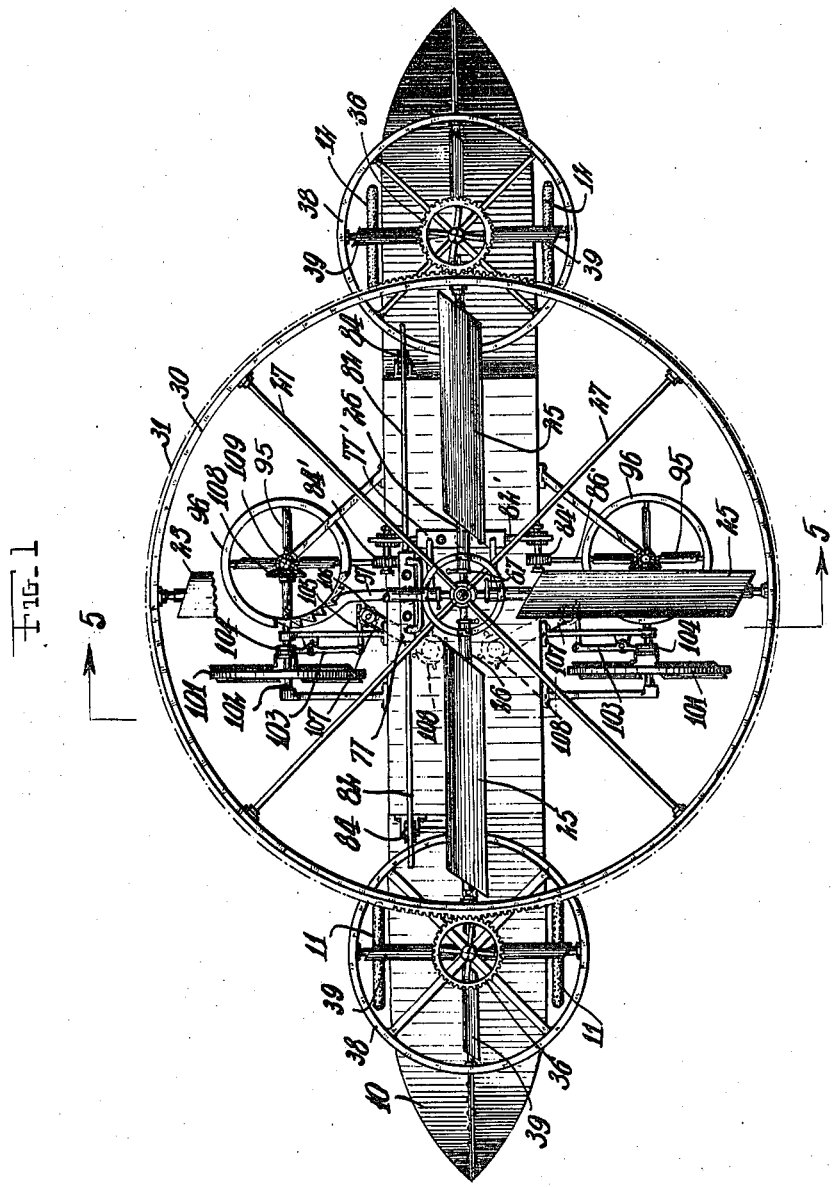
Inventor
William Brown
By
Attorney July 8, 1924.
W. BROWN
HELICOPTER
Filed Aug. 28, 1922
1,500,572
3 Sheets-Sheet 2
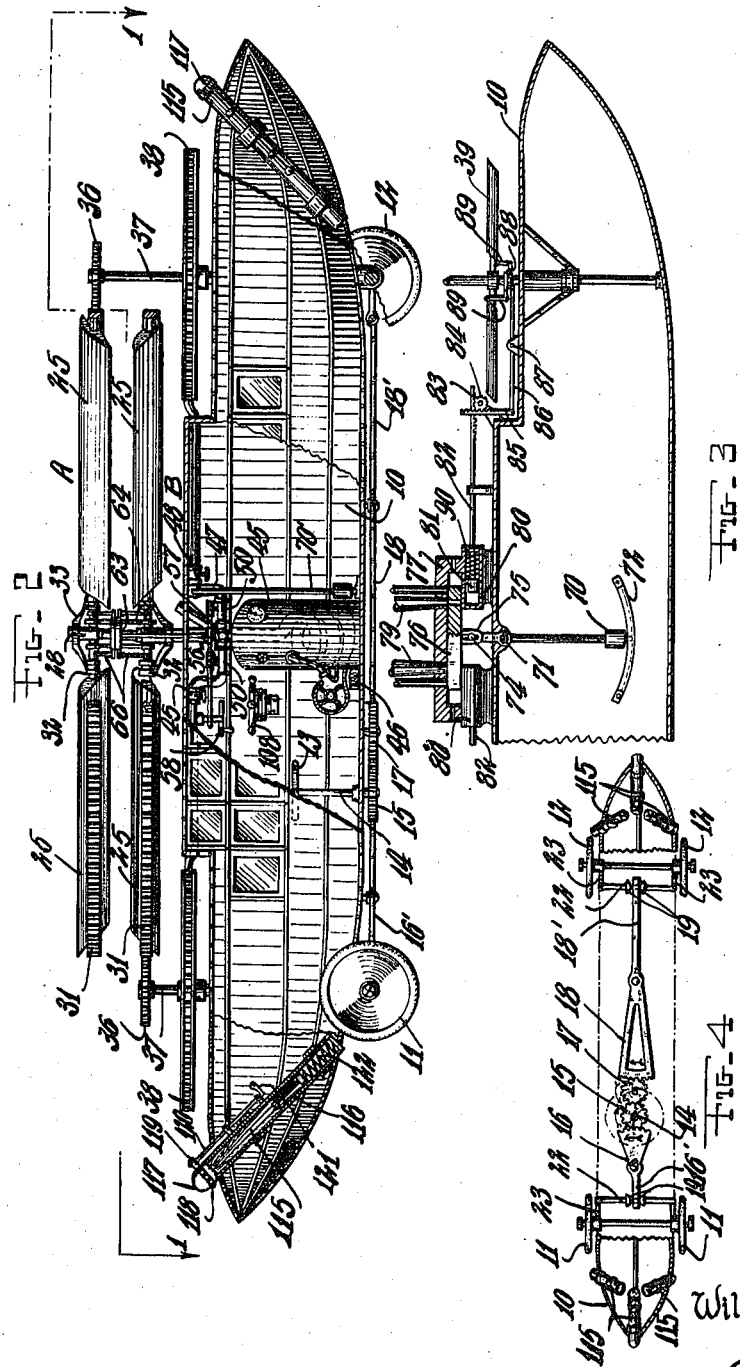

July 8, 1924.
W. BROWN
1,500,572
HELICOPTER
Filed Aug. 28, 1922    3 Sheets-Sheet 3
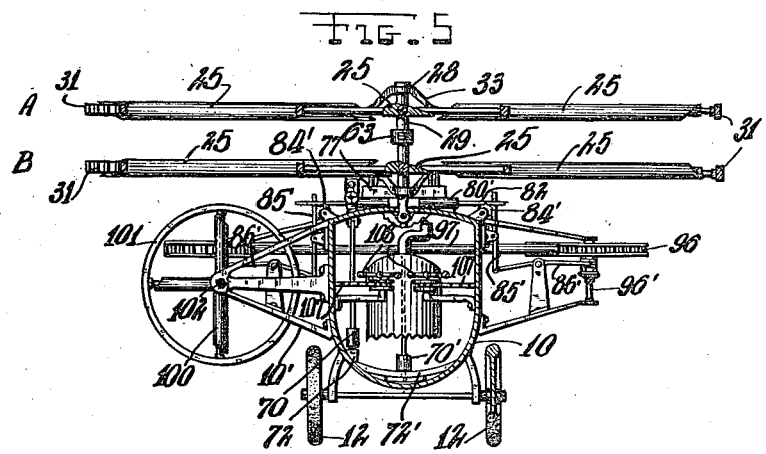
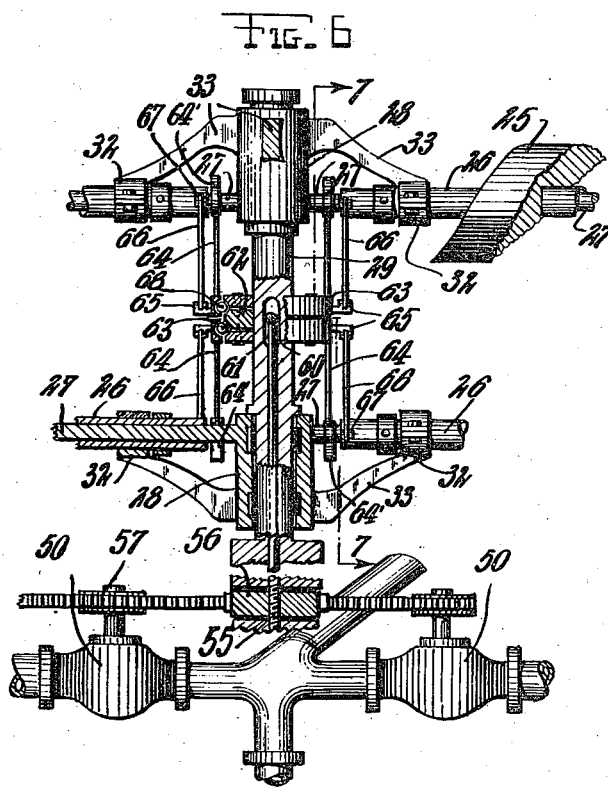
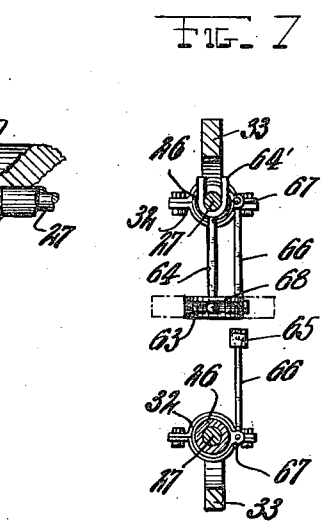
Inventor
William Brown
By
Attorney Patented July 8, 1924.

1,500,572

UNITED STATES PATENT OFFICE.

WILLIAM BROWN, OF NEW YORK, N. Y.

HELICOPTER.

Application filed August 28, 1922. Serial No. 584,673.

*To all whom it may concern:*

Be it known that I, WILLIAM BROWN, a citizen of the United States, residing at New York, in the county of New York and State of New York, have invented certain new and useful Improvements in Helicopters, of which the following is a specification.

This invention relates generally to flying machines, having more particular reference to flying machines of the type known as helicopters in which the lifting action is obtained by one or more elements rotating around a vertical axis, this type of flying machine offering the advantage over the aeroplane type of being designed to rise vertically, or to hover in a stationary position.

The invention has for an object to provide a novel type of helicopter having a rotary lifting element or elements whose pitch may be varied at will by the operator.

Other objects relate to the provision of novel and efficient drive means for the lifting and propelling devices, and the provision also of a novel means for maintaining both longitudinal and lateral stability.

For further comprehension of the invention, and of the objects and advantages thereof, reference will be had to the following description and accompanying drawings, and to the appended claims in which the various novel features of the invention are more particularly set forth.

Fig. 1 of the drawings is a horizontal sectional view of a helicopter flying machine constructed to my invention, this view being taken along the line 1—1 of Fig. 2.

Fig. 2 is a side elevation thereof, with parts broken out into longitudinal section.

Fig. 3 is a detail fragmentary longitudinal vertical sectional view, illustrating the construction of the means for maintaining longitudinal balance.

Fig. 4 is a detail plan view, with parts in horizontal section, showing the steering means and parachute holders.

Fig. 5 is a transverse vertical sectional view of the machine, taken on the line 5—5 of Fig. 1.

Fig. 6 is a detail view, part vertical section and part elevation, showing the means for adjusting the pitch of the helicopter blades.

Fig. 7 is a detail vertical sectional view taken on the line 7—7 of Fig. 6.

As here shown my improved helicopter comprises an elongated hollow body 10 which forms a cabin to receive the crew and passengers, and in the centre of which the power mechanism is located. This body is of general boat like formation so as to rest when desired on water and is also provided with pairs of wheels 11 and 12 for use on land.

For steering the machine when on land the respective pairs of wheels are arranged to swing oppositely in unison. This movement of the wheels is effected by turning a steering wheel 13 fixed on the upper end of a post 14 extending through and suitably journaled in the floor of the cabin. On the lower end of this post a gear 15 is fixed and meshes on one side with a gear segment 16 and on its other side with an idler gear 17 meshing in turn with another gear segment 18. The gear segments 16, 18 have rigid arm extensions 16′ and 18′ which engage between collars 19 fixed on transverse rods 22 connected at opposite ends to fingers 23 projecting from knuckle joints or ordinary construction on the wheels.

Referring now to the means for raising and supporting the machine in the air, the same comprises a pair of rotary elements arranged one above the other to rotate around a common vertical axis, and which are indicated generally by the reference characters A and B. Each of these elements comprises a series of radial blades 25 which are fixed on sleeves 26 freely surrounding spokes 27 which radiate from a hub 28 mounted on a fixed vertical shaft 29. The outer ends of the spokes 27 are fixed to a wooden rim 30 which has mounted thereon a steel gear ring 31. The inner ends of the sleeves 26 are supported by the two-part bearing members 32 formed on the ends of arm 33 radiating from the hub 28.

The gear rings 31 of the respective rotary elements A and B are engaged on their relatively opposed sides, longitudinally considered, by gear pinions 36 fixed on the upper ends of vertical shafts 37 suitably journaled in the cabin top and having fixed also thereon, just above said top, the turbine wheels 38 upon certain of the spokes of which are loosely mounted blades 39 of adjustable pitch, the manner of mounting these blades being similar to that of the blades 25.

To drive the turbine wheels, and through them the lifting members A and B, I provide a steam generating apparatus comprising a boiler 45 preferably heated by a gaso line burner 46 and from which the steam passes through a branched pipe 47 having nozzle ends located in position to direct steam jets upon the turbine wheels 38. Hand valves 48 are placed in the branches of pipe 47 whereby either branch may be individually controlled.

In addition, each branch of pipe 47 has a second valve 50, these valves 50 being operated in conjunction with the means for adjusting the blades 25 so as to automatically increase or decrease the steam flow as the pitch of the blades is increased or decreased.

The means for adjusting the blades 25 is shown in detail in Figs. 6 and 7 and comprises a rod 55 slidable in a suitable axial boring in the shaft 29 and having a threaded lower end engaging a sprocket wheel element 56 connected by suitable sprocket chain and wheel means indicated generally at 57, with the stems of the valves 50, rotation of these parts being effected by a handwheel 58.

The upper end of the rod 55 is fixed to a cross pin 60 which extends through a short vertical slot 61 in the shaft 29 and is fixed at its ends to a collar 62 freely surrounding said shaft. Surrounding the collar 62 are two rings 63, these rings being connected by vertical rods 64 with the spokes of the respective rotary members A and B, so as to rotate with the latter, the rods being here shown as fixed to the rings and having forked ends such as 64' straddling the spokes. Projecting from opposite sides of the rings 63 are pairs of lugs 65 to which are pivotally attached links 66 which connect to arms such as 67 projecting rigidly from the blades. To lessen the friction between the rings 63, which rotate with the elements A and B, and the collar 62 which is stationary I interpose between such rings and collar anti-friction bearing members such as 68.

When handwheel 58 is turned to increase or diminish the flow of steam through pipe 47 the rod 55 will be moved vertically, the collar 62 and rings 63 being correspondingly moved, and the pitch of the blades 25 changed.

Referring now to the blades 39 carried by the turbine wheels 38 the pitch of the latter is adapted for automatic adjustment to maintain longitudinal stability. As here shown this is effected by a pendulum 70 (Fig. 3) suspended as at 71 from the roof of the cabin 10 and guided at its lower end by an arcuate guide 72. This pendulum has rigid therewith an upwardly projecting arm 73 having a slot and pin connection 74 with a lug 75 in a slide valve 76 slidable in a valve chest 77, valve 76 has a port 78 in each end thereof which controls the flow of steam from steam pipes 79 to cylinders 80 in which are pistons such as 81 whose piston rods 82 are formed with rack teeth such as 83. The rack teeth 83 of each rod are engaged by a wide-faced pinion 84 which engages also a vertical rack-bar 85 connected to one end of a rocking lever 86 fulcrumed between its ends as at 87. The other end of lever 87 is engaged with a collar 88 slidable on the shaft 37 and connected by links 89 with suitable arms on the blades 39. The steam pressure in the cylinders 80 acts to move the pistons 81 in one direction only, movement in an opposite direction being effected by means of coiled expansion springs such as 90.

In like manner transverse balance is automatically maintained by means of blades 95 adjustably mounted on the spokes of turbine wheels 96 arranged on shafts such as 96' one at each side of the machine and driven by steam jets delivered through branches 97 from the pipe 47. Automatic adjustment of these blades 95 is effected by a pendulum 70' connected therewith by means indicated in Fig. 5 at 80', 82', 84', 85', and 86' and which is similar to that above described.

For steering and for horizontal propulsion I provide two other sets of blades 100 adjustable on the spokes of the vertical wheels 101 mounted on longitudinal shafts 102 supported by frames 10' one on each side of the machine, these blades being connected, similarly to the blades 95, to levers 103 through the medium of collars 104 on the shafts 102. Connected to the levers 103 are rack-bars 105 which engage gears 106 adjustable, by means of belts 107, from the handwheels 108 located in the cabin 10. The shafts 102 are driven from the shafts 96' of the turbine wheels 96 by means of bevel gears 108 thereon meshing with bevel gears 109 on the shaft 96'.

As a safety device in case of accident I provide at the front and rear of the machine a series of parachutes such as 115 which are folded into inclined tubes 116 on which are caps 117 connected by pin and bayonet slot means with the tubes 116. These caps have gears 118 thereon each engaged by a pinion 119 on a rock-shaft 120 on which is a handle 12'. A coiled spring 122 throws the parachute out of the tube 116 when the cap 117 is unlocked. Connected to the parachute is a rope which ties it to the cabin and which may be severed by a knife to release the parachute after a hook thereon has been engaged in the belt of the user.

While I have shown and described a preferred embodiment of my invention it will be understood that I do not limit myself to the exact details of construction and the right is retained to all changes and modifications coming within the scope of the invention as defined in the appended claims.

Having thus described my invention what I claim as new and desire to protect by

Letters Patent of the United States is as follows:—

1. A helicopter flying machine comprising one or more rotary sustaining elements each having a series of adjustable blades, turbine wheels operatively connected to said rotary elements to drive the same, pipes for directing steam jets on said turbine wheels, valves on said pipes, and a common means for controlling said valves and adjusting said blades.

2. In a flying machine, balancing means comprising a pair of horizontal turbine wheels, pipes for directing steam jets on said wheels, adjustable blades carried by said wheel, a pair of cylinders, pistons in said cylinders operatively connected to said blades to adjust the pitch thereof, a slide valve controlling admission of steam to one end of said cylinders, and a pendulum controlling said slide valve.

3. In a flying machine, balancing means comprising a pair of horizontal turbine wheels, pipes for directing steam jets on said wheels, adjustable blades carried by said wheel, a pair of cylinders, pistons in said cylinders operatively connected to said blades to adjust the pitch thereof, a slide valve controlling admission of steam to one end of said cylinders, and a pendulum controlling said slide valve, and springs in said cylinders for moving the said pistons in one direction.

4. In a flying machine, balancing means comprising a pair of horizontal turbine wheels, adjustable blades carried by said wheels, pipes for directing steam jets on said wheels, steam actuated means for adjusting the blades of said wheels, and a pendulum controlling the admission of steam to said last named means.

In testimony whereof I have affixed my signature.

WILLIAM BROWN.